United States Patent
Kahler et al.

(10) Patent No.: US 8,140,865 B2
(45) Date of Patent: Mar. 20, 2012

(54) PRE-CONFIGURING OF ENCRYPTION BANDS ON A DISK FOR USE IN A PLURALITY OF ARRAY CONFIGURATIONS

(75) Inventors: David Ray Kahler, Tucson, AZ (US); Richard Anthony Ripberger, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 506 days.

(21) Appl. No.: 12/367,484

(22) Filed: Feb. 6, 2009

(65) Prior Publication Data

US 2010/0205453 A1  Aug. 12, 2010

(51) Int. Cl.
*G06F 21/00* (2006.01)
(52) U.S. Cl. .................. 713/193; 713/189
(58) Field of Classification Search ............... None
See application file for complete search history.

(56) References Cited

U.S. PATENT DOCUMENTS

| | | | |
|---|---|---|---|
| 7,110,982 B2* | 9/2006 | Feldman et al. | 705/51 |
| 2005/0069298 A1* | 3/2005 | Kasiraj et al. | 386/125 |
| 2005/0081048 A1* | 4/2005 | Komarla et al. | 713/193 |
| 2008/0263089 A1* | 10/2008 | Cousins | 707/103 R |
| 2010/0083039 A1* | 4/2010 | Chew | 714/6 |
| 2010/0088525 A1* | 4/2010 | Ureche et al. | 713/193 |

* cited by examiner

*Primary Examiner* — Kaveh Abrishamkar
*Assistant Examiner* — Adrian Stoica
(74) *Attorney, Agent, or Firm* — Rabindranath Dutta; Konrad Raynes & Victor LLP

(57) ABSTRACT

A computational device receives input information on characteristics of customer data, critical metadata, and non-critical metadata, and characteristics of disk array configurations, wherein customer data is to be stored encrypted, wherein critical metadata is to be stored non-encrypted, and wherein non-critical metadata is to be stored encrypted or non-encrypted. The computational device determines band boundary information based on the received input information. Encrypting disks with pre-established bands are created based on the band boundary information and the encrypting disks are pre-initialized.

25 Claims, 6 Drawing Sheets

PRE-CONFIGURING OF ENCRYPTION BANDS ON A DISK FOR USE IN A PLURALITY OF ARRAY CONFIGURATIONS

BACKGROUND

1. Field

The disclosure relates to a method, a system, and an article of manufacture for the pre-configuring of encryption bands on a disk for use in a plurality of array configurations.

2. Background

Encrypting disks may provide a mechanism to define different areas on the disk, wherein the different areas are referred to as bands. Associated with each band is a cryptographic key, wherein the cryptographic key may be used to encrypt any data that is written to the band, and wherein the cryptographic key may also be used to decrypt any data that is read from the band. In certain situations, the cryptographic key is an encryption key.

Each band may be independently locked or unlocked for access such that locked bands require an access credential to allow a controller to access the data in the band. Data that is to be considered "encrypted" is locked before the data is stored in the band. Data that is to be considered "non-encrypted" is left unlocked while data is stored in the band. In certain situations, the encryption key is encrypted with the access credential while the band is locked.

SUMMARY OF THE PREFERRED EMBODIMENTS

Provided are a method, a system, and an article of manufacture, wherein a computational device receives input information on characteristics of customer data, critical metadata, and non-critical metadata, and characteristics of disk array configurations, wherein customer data is to be stored encrypted, wherein critical metadata is to be stored non-encrypted, and wherein non-critical metadata is to be stored encrypted or non-encrypted. The computational device determines band boundary information based on the received input information. Encrypting disks with pre-established bands are created based on the band boundary information and the encrypting disks are pre-initialized.

In additional embodiments, the encrypting disks are installed into a disk array, wherein a selected encrypting disk comprises at least a first band and a second band separated by a band boundary. A storage controller maps location of customer data on the first band of the encrypting disk, wherein the customer data is encrypted. The storage controller maps location of critical metadata on the second band of the disk, wherein the critical metadata is non-encrypted. The storage controller maps location of non-critical metadata, first on the second band of the disk, and if the second band is full then on the first band of the disk. The storage controller accesses the customer data, the critical metadata and the non-critical metadata from at least the first and second bands of the installed encrypting disks.

In certain additional embodiments, if the critical metadata and the non-critical metadata together do not fill the second band, then part of the second band is left unutilized.

In further embodiments, the critical metadata and the non-critical metadata comprise information regarding the customer data. The critical metadata is stored non-encrypted to provide selected information irrespective of whether or not the customer data is accessible, and wherein the size of the critical data is minimized to include only enough information that needs to be stored non-encrypted in the event the customer data cannot be accessed.

In certain embodiments, band boundary is determined by a supported disk array configuration with the smallest number of non-redundant data drives, wherein the band boundary is optimized by storing 1/N portion of the critical metadata on each of N non-redundant data drives and by placing the band boundary at the start of a critical metadata region.

BRIEF DESCRIPTION OF THE DRAWINGS

Referring now to the drawings in which like reference numbers represent corresponding parts throughout.

DETAILED DESCRIPTION

Figure 1:
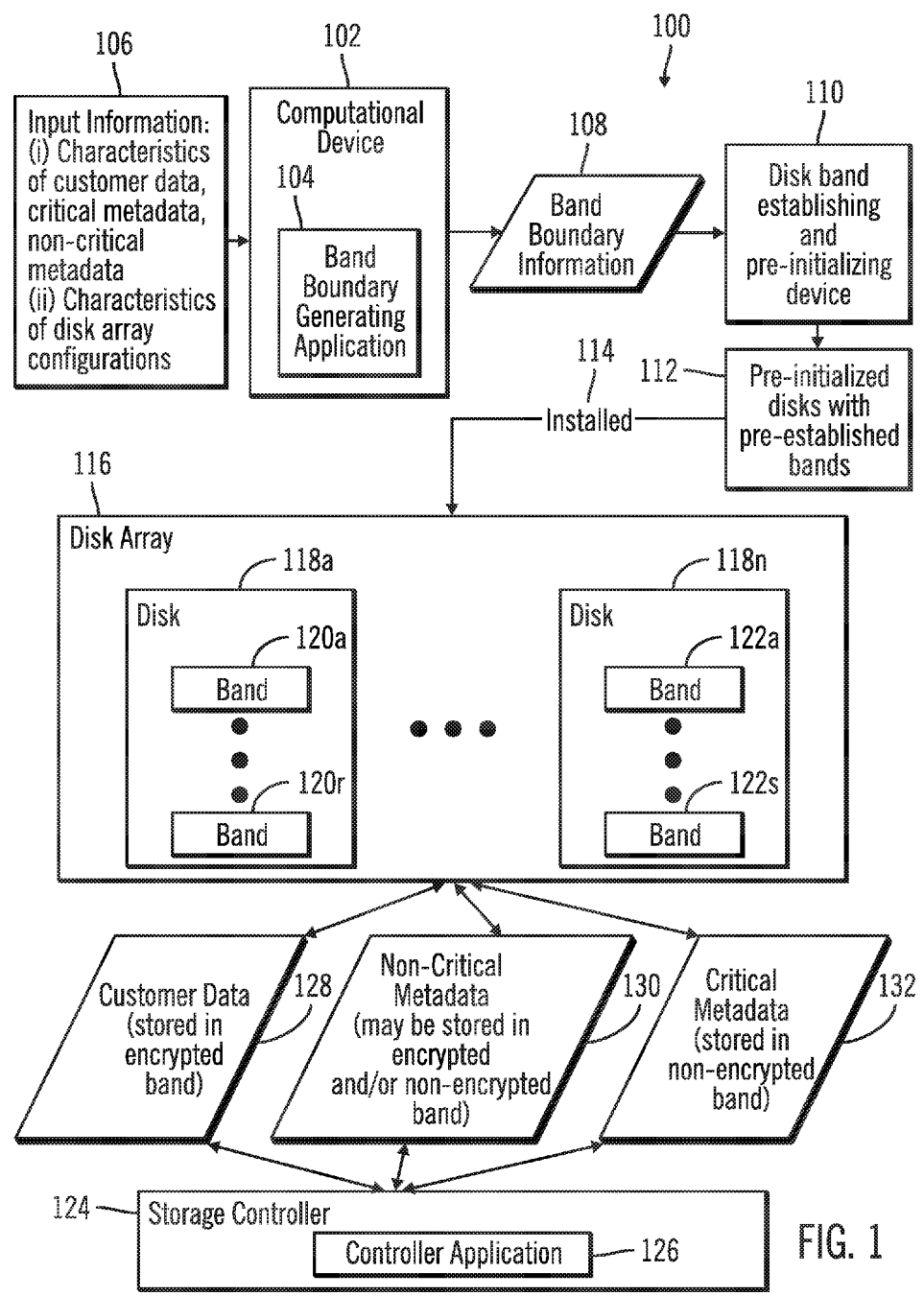
FIG. 1 illustrates a block diagram of an exemplary computing environment, in accordance with certain embodiments.

In the following description, reference is made to the accompanying drawings which form a part hereof and which illustrate several embodiments. It is understood that other embodiments may be utilized and structural and operational changes may be made.

Pre-Establishing Encryption Bands on a Disk

A disk may comprise a storage device that stores digitally encoded data. In certain embodiments, an exemplary disk may comprise a non-volatile storage device. For example, in certain embodiments an exemplary disk may comprise a magnetic storage device, wherein an exemplary magnetic storage device may comprise a hard disk. In alternative embodiments, an exemplary disk may comprise a storage device that is different from a magnetic storage device. It may be desirable to pre-initialize disks in a factory so that when the disks are installed at a customer site, the disks are readily available for use in creating disk arrays. For instance, in a Redundant Array of Independent Disks (RAID) array, proper parity needs to be created across the disk members of the array before the array can be used, and pre-initialization of the individual disks used in the array establishes the desired parity before the array is created. To allow an encrypting disk to be pre-initialized in the factory, the bands of the disk may have to be established before an initialization pattern is written on the disk, in order to encrypt the initialization pattern with the band's assigned encryption key. Any subsequent changes to the banding may require a re-initialization.

Storage controllers may need to store metadata on disks that are also used to store customer data, wherein the metadata may comprise information about the customer data and information related to the storage of the customer data. It may be necessary to access the stored metadata irrespective of whether or not the customer data is encrypted. It may also be necessary to access the stored metadata even when the encrypted customer data is inaccessible because of the inaccessibility of the access credential that may be necessary to unlock disk bands.

Therefore, it may be desirable to store the metadata in a separate band. An example of metadata that may be stored in a separate band is metadata that indicates which array the disks are used in, what position a disk occupies, and whether or not there is encrypted data on a disk array. This information may be necessary to determine what arrays exist in the system and what disks are associated with the arrays, such that, in the event the customer data bands cannot be unlocked, the system can at least determine what arrays are not accessible. Other metadata that may be required for the disk controller to continue operation may comprise the mapping of logical volume data to array locations. In the event that an encrypted array is inaccessible, the system may still need to know which logical volumes exist and which are impacted by the inaccessible array.

In certain embodiments, the size of the metadata area may vary with the width of the array that the disk is used in. For instance, if the amount of metadata for an array is fixed and there are N data drives in the array, then each disk in the array may contain $(1/N)^{th}$ of the metadata. In order to maximize the amount of capacity available to the customer on the disk, it may be desirable for the customer data be allowed to be stored on the disk such that the customer data fills any area that is not used by the metadata. Also when encryption is to be used, it is necessary for all of the customer data to be stored in a band that is locked so that the access to the customer data is secure. For a given array, it may be desirable to define the banding such that the band boundary occurs exactly between the customer data region and the metadata region. However, this ideal case is inconsistent with the desire to pre-initialize disks in the factory because the disk may potentially be used in one or more customer selected array configurations that may have different ideal band locations.

Certain embodiments define a banding such that a prebanded and pre-initialized disk may be usable in a number of different array configurations without loss of capacity, or with a minimal loss of capacity.

In certain embodiments, in order to provide pre-banding and pre-initialization, the metadata on the disks is organized into two different sub-regions. One region includes metadata that is necessary for the operation of the disk subsystem, and this type of metadata is referred to as a "critical metadata". The other region includes metadata that may be necessary when the customer data in the array is accessible, but not necessary when the customer data is not accessible, and this type of metadata is referred to as "non-critical metadata". In certain embodiments, the information on the disk is organized such that from start to end the disk includes: (1) Customer data; (2) Non-critical metadata; and (3) Critical metadata.

With the above disk organization, in certain embodiments the disk can be banded with two contiguous bands such that all of the customer data is in one band (referred to as the "encrypted band") and all of the critical metadata is in the other band (referred to as the "non-encrypted band"). The non-critical metadata may be placed in either the non-encrypted or the encrypted band. The non-critical metadata may be stored in the "non-encrypted band" because the non-critical metadata does not need to be encrypted. However, since the non-critical metadata does not need to be accessible at all times the non-critical metadata may also be stored in the encrypted band with the customer data. As such, in certain embodiments it is sufficient that the boundary between the encrypted and non-encrypted bands falls somewhere in the region between the end of the customer data and the start of the critical metadata.

By choosing a single fixed band boundary that resides somewhere within the non-critical metadata region for all array configurations of interest, disks may be pre-banded and pre-initialized in the factory and may still be utilized in a plurality of candidate array configurations.

Exemplary Embodiments

FIG. 1 illustrates a block diagram of an exemplary computing environment 100, in accordance with certain embodiments. In the exemplary computing environment 100, a computational device 102 includes a band boundary generating application 104. The computational device 102 may comprise any suitable computational device and may include a personal computer, a workstation, a mainframe, a server computer, a client computer, a laptop, a telephony device, etc. The computational device 102 receives input information 106, wherein the input information 106 may include:

(i) Characteristics of customer data, critical metadata, non-critical metadata; and (ii) Characteristics of disk array configurations.

In response to receiving the input information 106, the band boundary generating application 104 may generate a band boundary information 108. A disk band establishing and pre-initializing device 110 may use the band boundary information 108 to create "pre-initialized disks with pre-established bands" 112.

The "pre-initialized disks with pre-established bands" 112 may be installed 114 into a disk array 116, wherein the disks 118a . . . 118n included in the disk array 116 correspond to the "pre-initialized disks with pre-established bands" 112. Exemplary bands 120a . . . 120r, 122a . . . 122s are shown in the disks 118a . . . 118n of the disk array 116. In certain exemplary embodiments, each disk has two bands, one band being an encrypted band and the other band being a non-encrypted band.

FIG. 1 also shows a storage controller 124 that includes a controller application 126. The controller application 126 stores customer data 128 in an encrypted band. Non-critical metadata 130 is stored by the controller application 126 in either the encrypted band or a non-encrypted band. It should be noted that in certain embodiments the non-critical metadata 130 may span both the encrypted band and the non-encrypted band. The controller application 126 stores the critical metadata 132 in a non-encrypted band.

Figure 2:
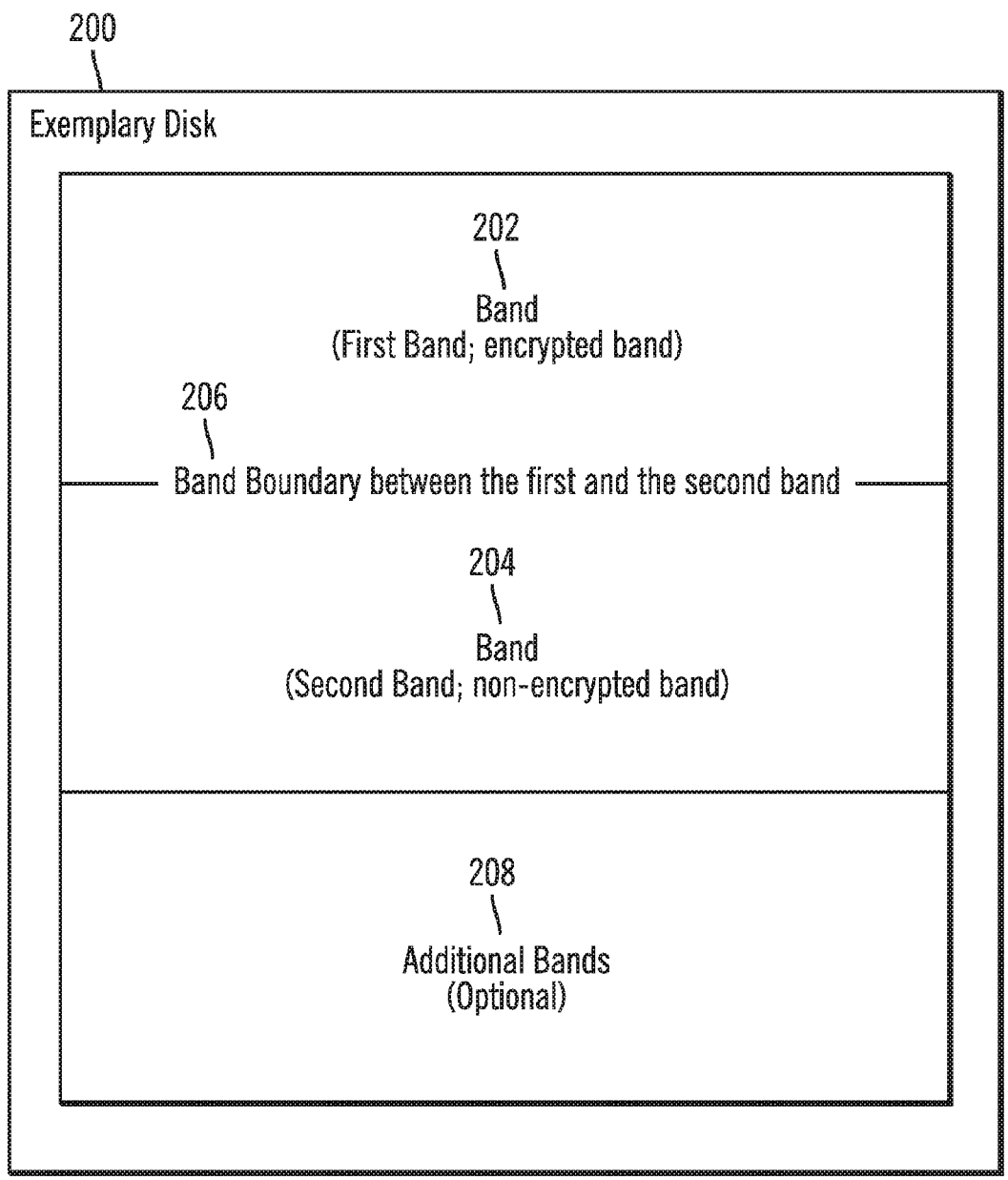
FIG. 2 illustrates a block diagram of an exemplary disk with at least two bands separated by a band boundary, in accordance with certain embodiments.

FIG. 2 illustrates a block diagram of an exemplary disk 200 with at least two bands 202, 204 separated by a band boundary 206, in accordance with certain embodiments. The exemplary disk 200 may correspond to any of the disks 118a . . . 118n shown in FIG. 1. The band boundary 206 delineates the boundary between band 202 and band 204, wherein the band 202 may be referred to as a first band or an encrypted band and the band 204 may be referred to as a second band or a non-encrypted band. Additional bands 208 in addition to the first and second bands 202, 204 may also be implemented in certain embodiments.

Figure 3:
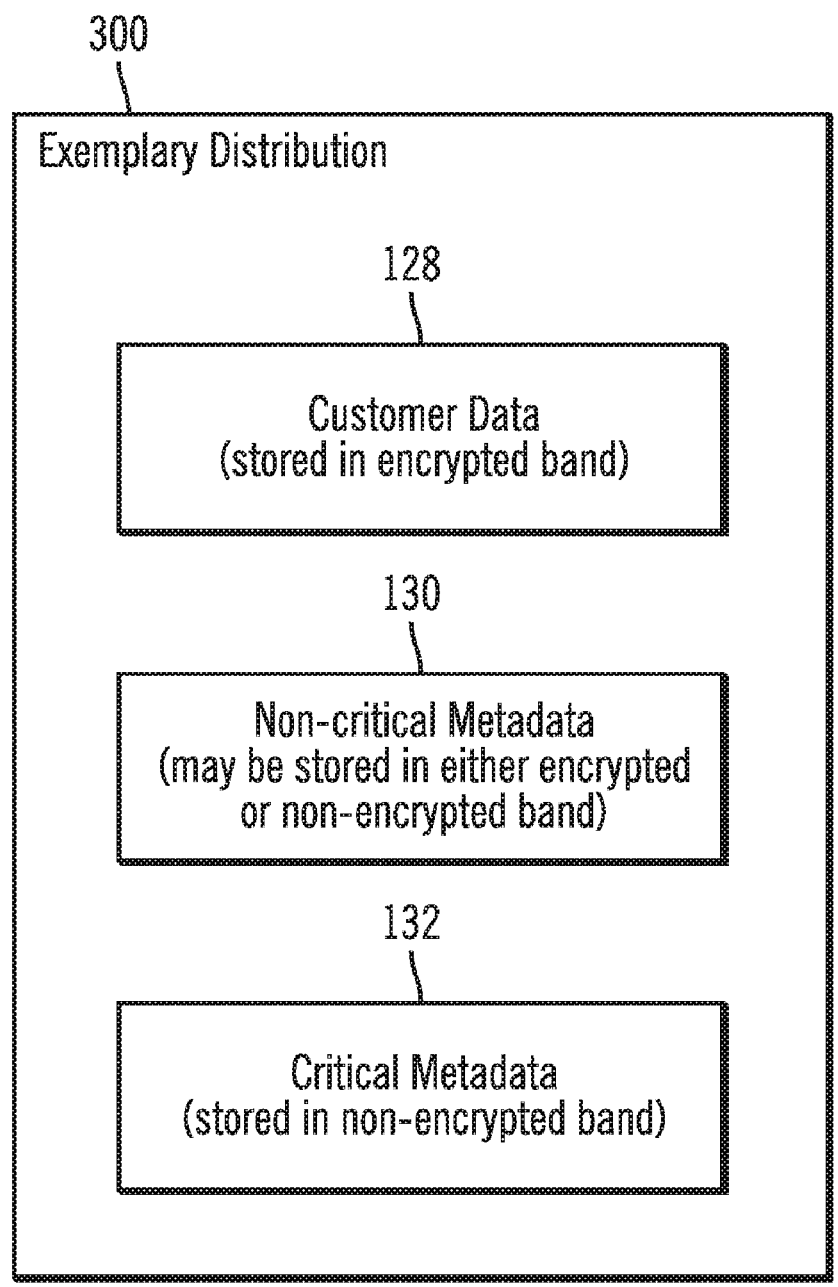
FIG. 3 illustrates a block diagram that shows an exemplary distribution of customer data, non-critical metadata, and critical metadata between encrypted and non-encrypted bands, in accordance with certain embodiments.

FIG. 3 illustrates a block diagram that shows an exemplary distribution 300 of customer data 128, non-critical metadata 130, and critical metadata 132 between encrypted and non-encrypted bands, in accordance with certain embodiments. In an exemplary embodiment, the customer data 128 is stored in the encrypted band 202 shown in FIG. 2, the non-critical metadata 130 is stored in either the encrypted band 202 or the non-encrypted band 204 shown in FIG. 2, and the critical metadata 132 is stored in the non-encrypted band 204 shown in FIG. 2.

Figure 4:
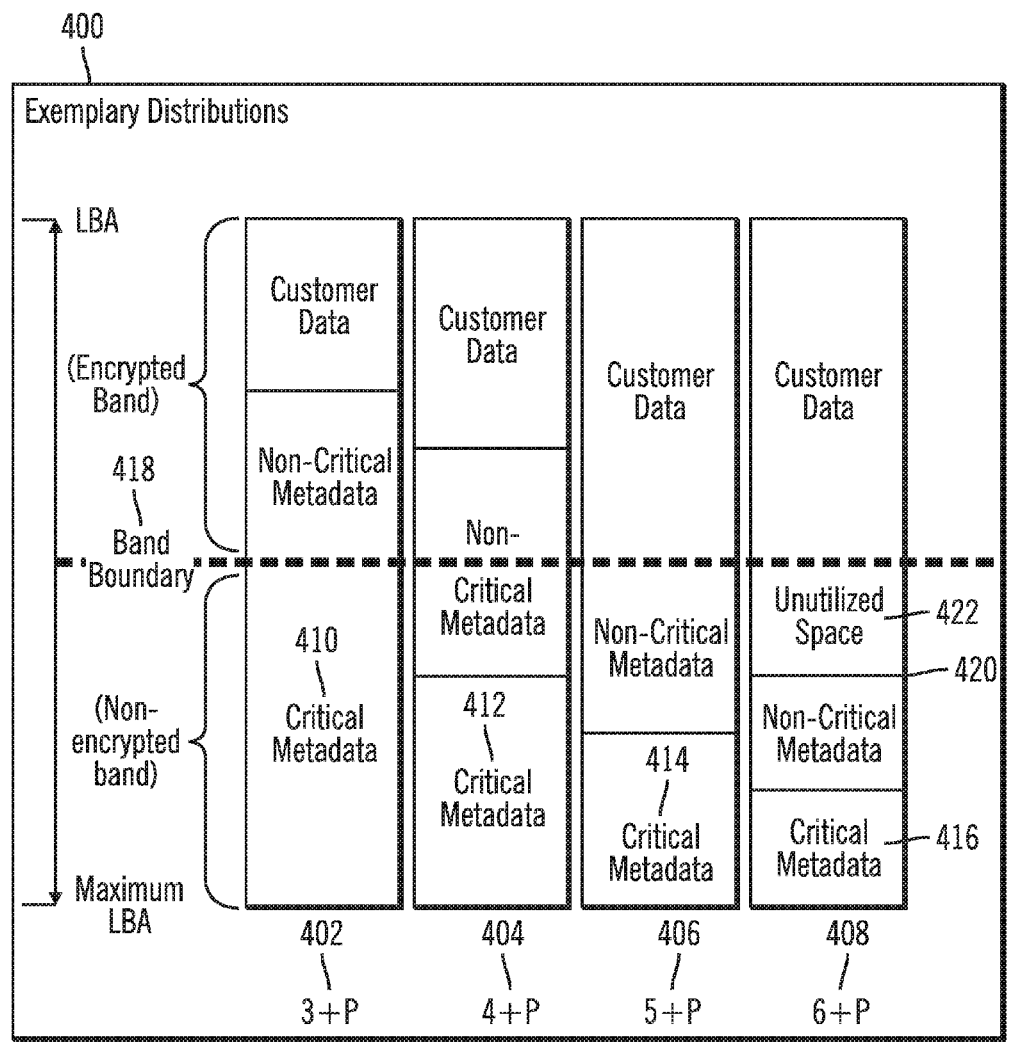
FIG. 4 illustrates a block diagram that that shows exemplary distributions of customer data, non-critical metadata, and critical metadata between encrypted and non-encrypted bands in a plurality of exemplary disk array configurations, in accordance with certain embodiments.

FIG. 4 illustrates a block diagram that that shows exemplary distributions 400 of customer data, non-critical metadata, and critical metadata between encrypted and non-encrypted bands in a plurality of exemplary disk array configurations 402, 404, 406, 408, in accordance with certain embodiments. The exemplary disk array configurations 402, 404, 406 408 may be implemented via the disks 118a ... 118n shown in FIG. 1. In the disk array configuration 3+P (reference numeral 402) there are 3 data disks and 1 parity disk. In the disk array configuration 4+P (reference numeral 404) there are 4 data disks and 1 parity disk. In the disk array configuration 5+P (reference numeral 406) there are 5 data disks and 1 parity disk. In the disk array configuration 6+P (reference numeral 408) there are 6 data disks and 1 parity disk In certain embodiments, the most narrow array may have the largest critical metadata region. For example, in FIG. 4, the most narrow array (i.e., the array with the fewest number of data disks) is the 3+P disk array configuration 402, and the critical metadata region 410 is the largest among the critical metadata regions 410, 412, 414, 416.

For example, for a RAID-1 configuration where there is effectively one data drive and one mirrored drive, all of the critical metadata is stored on the one data drive. Each larger array size (e.g. RAID 2+P, 3+P, 4+P, N+P) has a smaller critical metadata region. If there are N data drives, then the critical metadata can be spanned across the N drives so the critical metadata region can be reduced to 1/N of the size required for a single data drive. For a set of supported array configurations, the smallest width array determines the "highest logical block address (LBA)" along which the band boundary 418 is positioned as shown in FIG. 4 for the case of 3+P, 4+P, 5+P, 6+P array configurations. As shown in FIG. 4, the critical metadata region 410 on the 3+P array configuration 402 has the "highest LBA" and if the band boundary 418 is placed at the start of the critical metadata region 410, then it will be guaranteed that the critical metadata area for any wider array is in the non-encrypted band.

Having selected the band boundary, certain embodiments determine where the beginning of the non-critical metadata region is relative to this selected band boundary. As shown in FIG. 4, the widest array that has the band boundary 418 within the non-critical metadata region but nearest to the end of the customer data region is the 5+P array (reference numeral 406). If there are wider arrays that have the selected band boundary 418 above the start of the non-critical metadata region as shown in FIG. 4 for the 6+P array (reference numeral 408), the constraints of not having customer data in the non-encrypting band require that a portion of the customer data region, between the band boundary 418 and the start (reference numeral 420) of the non-critical metadata, be left unused, wherein the unused portion is indicated in FIG. 4 as the unutilized space 422.

In certain embodiments, the flexibility in the number of array configurations that may be supported without impacting the customer data region is in part a function of the sizes of the two metadata regions. When the non-critical metadata region is large relative to the critical metadata region (or if the non-critical metadata requirements grow with the width of the array), then the selected banding position has more room to shift into the non-critical data region as the arrays get wider. Certain embodiments attempt to minimize the amount of critical metadata that is to be maintained to allow for a wider range of array configurations that do not impact capacity as a result of the fixed banding.

In certain embodiments, if the critical metadata is of a fixed size, then for the fixed size critical metadata the band boundary information may be determined based on the disk array that the fewest number of data disks in a plurality of disk arrays.

In certain embodiments, the band boundary, which is applicable to all disks irregardless of the array configuration that the disk is subsequently used in, is determined by the size of the critical metadata when stored on the array configuration with the smallest number of non-redundant data disks that is supported by the disk controller. More specifically, for a given amount of critical metadata that is distributed across the set of non-redundant data drives of the array in some fashion such that the critical data is localized to the end of the disk with the non-encrypted band, the position of the band boundary that ensures that no critical metadata will be encrypted will be furthest away from this end of the disk when the data has the fewest number of non-redundant data disks to be distributed over. In some embodiments, the distribution of the critical metadata may be such that roughly 1/N of the data is stored on each of the N non-redundant data disks such that the band boundary location is optimized to make the size of the band with the critical metadata as small as possible for the amount of critical metadata that must be stored.

In FIG. 4, an exemplary distribution of the customer data, the non-critical metadata, and the critical metadata have been shown. Other distributions of the customer data, the non-critical metadata and the critical metadata may be implemented in alternative embodiments. For example, it may be possible to distribute the customer data in a plurality of non-contiguous regions, and also distribute the non-critical metadata and the critical metadata in a plurality of non-contiguous regions. Sections of non-critical metadata and critical metadata may be interspersed among the customer data that is distributed in the plurality of non-contiguous regions. The constraints on the encryption or non-encryption of the customer data, the non-critical metadata, and the critical metadata as shown in FIG. 3 are not violated when such interspersing is performed. FIG. 2 has shown additional bands 208 that may be implemented in certain embodiments and these additional bands may include the interspersed customer data, the non-critical metadata, and the critical metadata.

Figure 5:
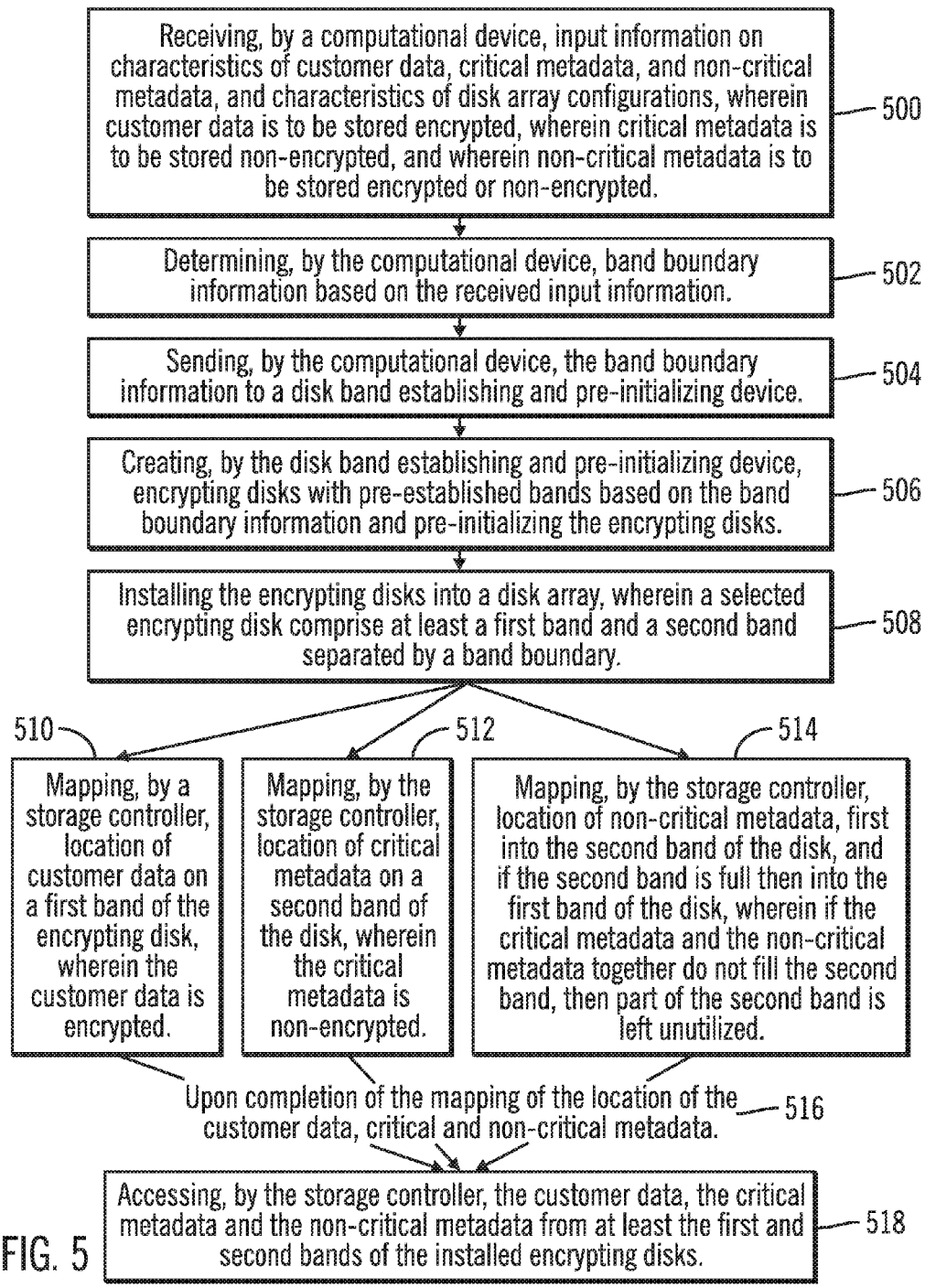
FIG. 5 illustrates a flowchart that shows operations performed in the computing environment of FIG. 1, in accordance with certain embodiments.

FIG. 5 illustrates a flowchart that shows operations performed in the computing environment 100 of FIG. 1, in accordance with certain embodiments.

Control starts at block 500 in which a computational device 102 receives input information 106 on characteristics of customer data, critical metadata, and non-critical metadata, and characteristics of disk array configurations, wherein customer data is to be stored encrypted, wherein critical metadata is to be stored non-encrypted, and wherein non-critical metadata is to be stored encrypted or non-encrypted.

The computational device 102 determines (at block 502) band boundary information 206, 418 based on the received input information 106. Control proceeds to block 504 in which the computational device 102 sends the band boundary information 206, 418 to a disk band establishing and pre-initializing device 110.

The disk band establishing and pre-initializing device 110 creates (at block 506) encrypting disks 112 with pre-established bands based on the band boundary information 206, 418 and pre-initializes the encrypting disks. The encrypting disks 112 are installed (at block 508) into a disk array 116, wherein a selected encrypting disk comprise at least a first band 202 and a second band 204 separated by the band boundary 206.

From block 508 control proceeds in parallel to block 510, 512, and 514. At block 510, the storage controller 124 maps location of customer data 128 on the first band 202 of the encrypting disk, wherein the customer data 128 is encrypted. The storage controller 124 maps (at block 512) location of critical metadata 132 on the second band 204 of the disk, wherein the critical metadata 132 is non-encrypted. The storage controller 124 maps (at block 514) location of non-critical metadata, first into the second band 204 of the disk, and if the second band 204 is full then into the first band 202 of the disk, wherein if the critical metadata and the non-critical metadata together do not fill the second band 202, then part of the second band is left unutilized (as shown via reference numeral 422 in FIG. 4).

In response to completion of the mapping of the location of the customer data, critical and non-critical metadata (reference numeral 516), the storage controller 124 accesses (at block 518) the customer data 128, the critical metadata 132 and the non-critical metadata 130 from at least the first band 202 and the second band 204 of the installed encrypting disks 118a . . . 118n.

Therefore, FIGS. 1-5 illustrate certain embodiments for distributing customer data, non-critical metadata, and critical metadata between an encrypted band and a non-encrypted band based on the pre-determination of a band boundary between the encrypted and the non-encrypted band, wherein the pre-determined band boundary has earlier been used to pre-configure the disks that are to be installed in a disk array.

In certain embodiments, the code to support banding may not be shipped in a disk product. While the code may be necessary in manufacturing the disks, the removal of this requirement from the disk product may reduce the overall development expense for using encryption. Furthermore, in certain embodiments, if a re-encryption of customer data is performed then there may not be any need to modify the band boundary or modify the critical metadata.

In certain embodiments, subsequent to the creation of encrypting disks with pre-established bands based on the band boundary information and the pre-initialization of the encrypting disks, the pre-initialized encrypting disks are stored in a disk controller, and the disk controller recognizes that the disks are pre-initialized, thereby allowing the disks to be used immediately for the creation of RAID arrays.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, or an embodiment comprising hardware processing software elements. In certain embodiments, selected operations may be implemented in microcode of one or more computational devices 102 and storage controllers 124 of FIG. 1, and employed with memory 606 and implemented by processor 604 of FIG. 6.

Furthermore, certain embodiments can take the form of a computer program product accessible from a computer usable or computer readable storage medium providing program code for use by or in connection with one or more controllers and/or computational devices. For the purposes of this description, a computer usable or computer readable storage medium can be any apparatus that can contain, store, communicate, propagate, or transport the program for use by or in connection with the instruction execution system, apparatus, or device.

The storage medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, and random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 6:
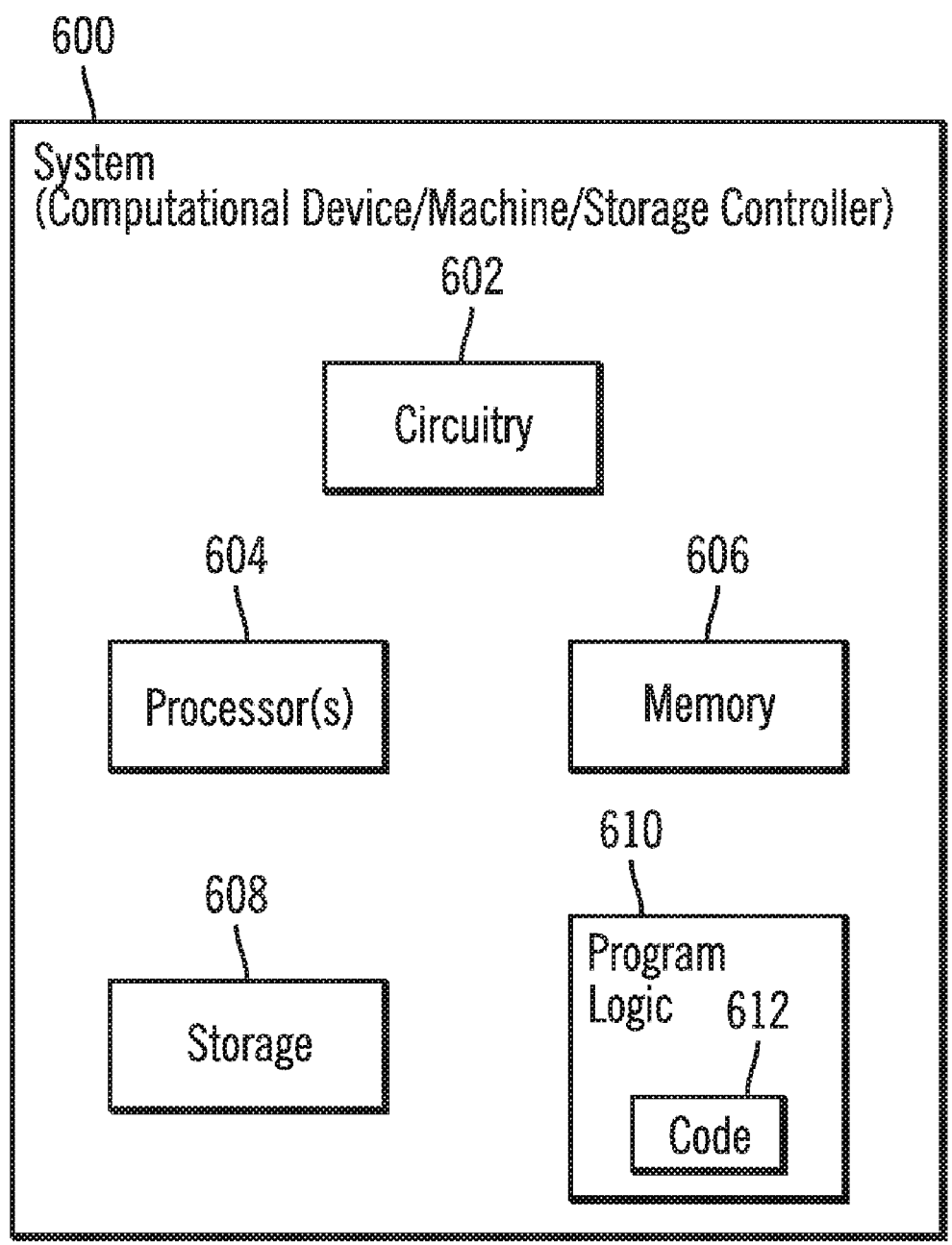
FIG. 6 illustrates a block diagram that shows certain elements that may be included in the computing environment of FIG. 1, in accordance with certain embodiments.

FIG. 6 illustrates a block diagram that shows certain elements that may be included in the computing environment 100 in the computational device 102 and the storage controller 124 in accordance with certain embodiments. The computational device 102 and/or the storage controller 124 may also be referred to as a system 600, and may include a circuitry 602 that may in certain embodiments include at least a processor 604. The system 600 may also include a memory 606 (e.g., a volatile memory device), and storage 608. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-6 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
receiving, by a computational device, input information on characteristics of customer data, critical metadata, and non-critical metadata, and characteristics of disk array configurations, wherein customer data is to be stored encrypted, wherein critical metadata is to be stored non-encrypted, wherein non-critical metadata is to be stored encrypted or non-encrypted, wherein the size of the critical metadata is minimized to include only enough information, and wherein the information needs to be stored non-encrypted in the event the customer data cannot be accessed;
determining, by the computational device, band boundary information based on the received input information; and
creating encrypting disks with pre-established bands based on the band boundary information and pre-initializing the encrypting disks, wherein a band is a contiguous set of logical block addresses.

2. The method of claim 1, further comprising:
installing the encrypting disks into a disk array, wherein a selected encrypting disk comprises at least a first band and a second band separated by a band boundary;
detecting that the encrypting disks are pre-initialized to eliminate the need to initialize the encrypting disks before using the encrypting disks in the disk array,
mapping, by a storage controller, location of customer data on the first band of the encrypting disk, wherein the customer data is encrypted;
mapping, by the storage controller, location of critical metadata on the second band of the disk, wherein the critical metadata is non-encrypted;
mapping, by the storage controller, location of non-critical metadata, first on the second band of the disk, and if the second band is full then on the first band of the disk; and
accessing, by the storage controller, the customer data, the critical metadata and the non-critical metadata from at least the first and second bands of the installed encrypting disks.

3. The method of claim 2, wherein if the critical metadata and the non-critical metadata together do not fill the second band, then part of the second band is left unutilized.

4. The method of claim 1, wherein:
the critical metadata and the non-critical metadata comprise information regarding the customer data; and
the critical metadata is to be stored non-encrypted to provide selected information irrespective of whether or not the customer data is accessible, wherein availability of the non-critical metadata is necessary when the customer data is accessible but availability of the non-critical metadata is not necessary when the customer data is not accessible.

5. The method of claim 1, wherein band boundary is determined by a supported disk array configuration with the smallest number of non-redundant data drives, and wherein the band boundary is optimized by storing 1/N portion of the critical metadata on each of N non-redundant data drives and by placing the band boundary at the start of a critical metadata region.

6. A system, comprising:
a memory; and
a processor coupled to the memory, wherein the processor performs operations, the operations comprising:
receiving input information on characteristics of customer data, critical metadata, and non-critical metadata, and characteristics of disk array configurations, wherein customer data is to be stored encrypted, wherein critical metadata is to be stored non-encrypted, wherein non-critical metadata is to be stored encrypted or non-encrypted, wherein the size of the critical metadata is minimized to include only enough information, and wherein the information needs to be stored non-encrypted in the event the customer data cannot be accessed;
determining band boundary information based on the received input information; and
creating encrypting disks with pre-established bands based on the band boundary information and pre-initializing the encrypting disks, wherein a band is a contiguous set of logical block addresses.

7. The system of claim 6, the operations further comprising:
installing the encrypting disks into a disk array, wherein a selected encrypting disk comprises at least a first band and a second band separated by a band boundary;
detecting that the encrypting disks are pre-initialized to eliminate the need to initialize the encrypting disks before using the encrypting disks in the disk array,
mapping, by a storage controller, location of customer data on the first band of the encrypting disk, wherein the customer data is encrypted;
mapping, by the storage controller, location of critical metadata on the second band of the disk, wherein the critical metadata is non-encrypted;
mapping, by the storage controller, location of non-critical metadata, first on the second band of the disk, and if the second band is full then on the first band of the disk; and
accessing, by the storage controller, the customer data, the critical metadata and the non-critical metadata from at least the first and second bands of the installed encrypting disks.

8. The system of claim 7, wherein if the critical metadata and the non-critical metadata together do not fill the second band, then part of the second band is left unutilized.

9. The system of claim 6, wherein:
the critical metadata and the non-critical metadata comprise information regarding the customer data; and
the critical metadata is to be stored non-encrypted to provide selected information irrespective of whether or not the customer data is accessible, wherein availability of the non-critical metadata is necessary when the customer data is accessible but availability of the non-critical metadata is not necessary when the customer data is not accessible.

10. The system of claim 6, wherein band boundary is determined by a supported disk array configuration with the smallest number of non-redundant data drives, and wherein the band boundary is optimized by storing 1/N portion of the critical metadata on each of N non-redundant data drives and by placing the band boundary at the start of a critical metadata region.

11. A computer readable storage device, wherein code stored in the computer readable storage device when executed by a processor causes operations, the operations comprising:
receiving, by a computational device, input information on characteristics of customer data, critical metadata, and non-critical metadata, and characteristics of disk array configurations, wherein customer data is to be stored encrypted, wherein critical metadata is to be stored non-encrypted, wherein non-critical metadata is to be stored encrypted or non-encrypted, wherein the size of the critical metadata is minimized to include only enough information, and wherein the information needs to be stored non-encrypted in the event the customer data cannot be accessed;
determining, by the computational device, band boundary information based on the received input information; and
creating encrypting disks with pre-established bands based on the band boundary information and pre-initializing the encrypting disks, wherein a band is a contiguous set of logical block addresses.

12. The computer readable storage device of claim 11, the operations further comprising:
installing the encrypting disks into a disk array, wherein a selected encrypting disk comprises at least a first band and a second band separated by a band boundary;
detecting that the encrypting disks are pre-initialized to eliminate the need to initialize the encrypting disks before using the encrypting disks in the disk array,
mapping, by a storage controller, location of customer data on the first band of the encrypting disk, wherein the customer data is encrypted;
mapping, by the storage controller, location of critical metadata on the second band of the disk, wherein the critical metadata is non-encrypted;
mapping, by the storage controller, location of non-critical metadata, first on the second band of the disk, and if the second band is full then on the first band of the disk; and
accessing, by the storage controller, the customer data, the critical metadata and the non-critical metadata from at least the first and second bands of the installed encrypting disks.

13. The computer readable storage device of claim 12, the operations further comprising:
if the critical metadata and the non-critical metadata together do not fill the second band, then part of the second band is left unutilized.

14. The computer readable storage device of claim 11, wherein:
the critical metadata and the non-critical metadata comprise information regarding the customer data; and
the critical metadata is to be stored non-encrypted to provide selected information irrespective of whether or not the customer data is accessible, wherein availability of the non-critical metadata is necessary when the customer data is accessible but availability of the non-critical metadata is not necessary when the customer data is not accessible.

15. The computer readable storage device of claim 11, wherein band boundary is determined by a supported disk array configuration with the smallest number of non-redundant data drives, and wherein the band boundary is optimized by storing 1/N portion of the critical metadata on each of N non-redundant data drives and by placing the band boundary at the start of a critical metadata region.

16. A method for deploying computing infrastructure, comprising integrating computer-readable code into a computing system, wherein the code in combination with the computing system is capable of performing:

receiving input information on characteristics of customer data, critical metadata, and non-critical metadata, and characteristics of disk array configurations, wherein customer data is to be stored encrypted, wherein critical metadata is to be stored non-encrypted, wherein non-critical metadata is to be stored encrypted or non-encrypted, wherein the size of the critical metadata is minimized to include only enough information, and wherein the information needs to be stored non-encrypted in the event the customer data cannot be accessed;

determining band boundary information based on the received input information; and creating encrypting disks with pre-established bands based on the band boundary information and pre-initializing the encrypting disks, wherein a band is a contiguous set of logical block addresses.

17. The method for deploying computing infrastructure of claim 16, wherein the code in combination with the computing system is capable of performing:

installing the encrypting disks into a disk array, wherein a selected encrypting disk comprises at least a first band and a second band separated by a band boundary;

detecting that the encrypting disks are pre-initialized to eliminate the need to initialize the encrypting disks before using the encrypting disks in the disk array, mapping, by a storage controller, location of customer data on the first band of the encrypting disk, wherein the customer data is encrypted;

mapping, by the storage controller, location of critical metadata on the second band of the disk, wherein the critical metadata is non-encrypted;

mapping, by the storage controller, location of non-critical metadata, first on the second band of the disk, and if the second band is full then on the first band of the disk; and accessing, by the storage controller, the customer data, the critical metadata and the non-critical metadata from at least the first and second bands of the installed encrypting disks.

18. The method for deploying computing infrastructure of claim 17, wherein if the critical metadata and the non-critical metadata together do not fill the second band, then part of the second band is left unutilized.

19. The method for deploying computing infrastructure of claim 16, wherein:

the critical metadata and the non-critical metadata comprise information regarding the customer data; and the critical metadata is to be stored non-encrypted to provide selected information irrespective of whether or not the customer data is accessible, wherein availability of the non-critical metadata is necessary when the customer data is accessible but availability of the non-critical metadata is not necessary when the customer data is not accessible.

20. The method for deploying computing infrastructure of claim 16, wherein band boundary is determined by a supported disk array configuration with the smallest number of non-redundant data drives, and wherein the band boundary is optimized by storing 1/N portion of the critical metadata on each of N non-redundant data drives and by placing the band boundary at the start of a critical metadata region.

21. A system, comprising:
a computational device;
means for receiving, by the computational device, input information on characteristics of customer data, critical metadata, and non-critical metadata, and characteristics of disk array configurations, wherein customer data is to be stored encrypted, wherein critical metadata is to be stored non-encrypted, wherein non-critical metadata is to be stored encrypted or non-encrypted, wherein the size of the critical data is minimized to include only enough information, and wherein the information needs to be stored non-encrypted in the event the customer data cannot be accessed;
means for determining, by the computational device, band boundary information based on the received input information; and
means for creating encrypting disks with pre-established bands based on the band boundary information and pre-initializing the encrypting disks, wherein a band is a contiguous set of logical block addresses.

22. The system of claim 21, further comprising:
a storage controller;
installing the encrypting disks into a disk array, wherein a selected encrypting disk comprises at least a first band and a second band separated by a band boundary;
means for detecting that the encrypting disks are pre-initialized to eliminate the need to initialize the encrypting disks before using the encrypting disks in the disk array,
means for mapping, by a storage controller, location of customer data on the first band of the encrypting disk, wherein the customer data is encrypted;
means for mapping, by the storage controller, location of critical metadata on the second band of the disk, wherein the critical metadata is non-encrypted;
means for mapping, by the storage controller, location of non-critical metadata, first on the second band of the disk, and if the second band is full then on the first band of the disk; and
means for accessing, by the storage controller, the customer data, the critical metadata and the non-critical metadata from at least the first and second bands of the installed encrypting disks.

23. The system of claim 22, wherein if the critical metadata and the non-critical metadata together do not fill the second band, then part of the second band is left unutilized.

24. The system of claim 21, wherein:
the critical metadata and the non-critical metadata comprise information regarding the customer data; and
the critical metadata is to be stored non-encrypted to provide selected information irrespective of whether or not the customer data is accessible, wherein availability of the non-critical metadata is necessary when the customer data is accessible but availability of the non-critical metadata is not necessary when the customer data is not accessible.

25. The system of claim 21, wherein band boundary is determined by a supported disk array configuration with the smallest number of non-redundant data drives, and wherein the band boundary is optimized by storing 1/N portion of the critical metadata on each of N non-redundant data drives and by placing the band boundary at the start of a critical metadata region.

* * * * *